Patented Mar. 31, 1925.

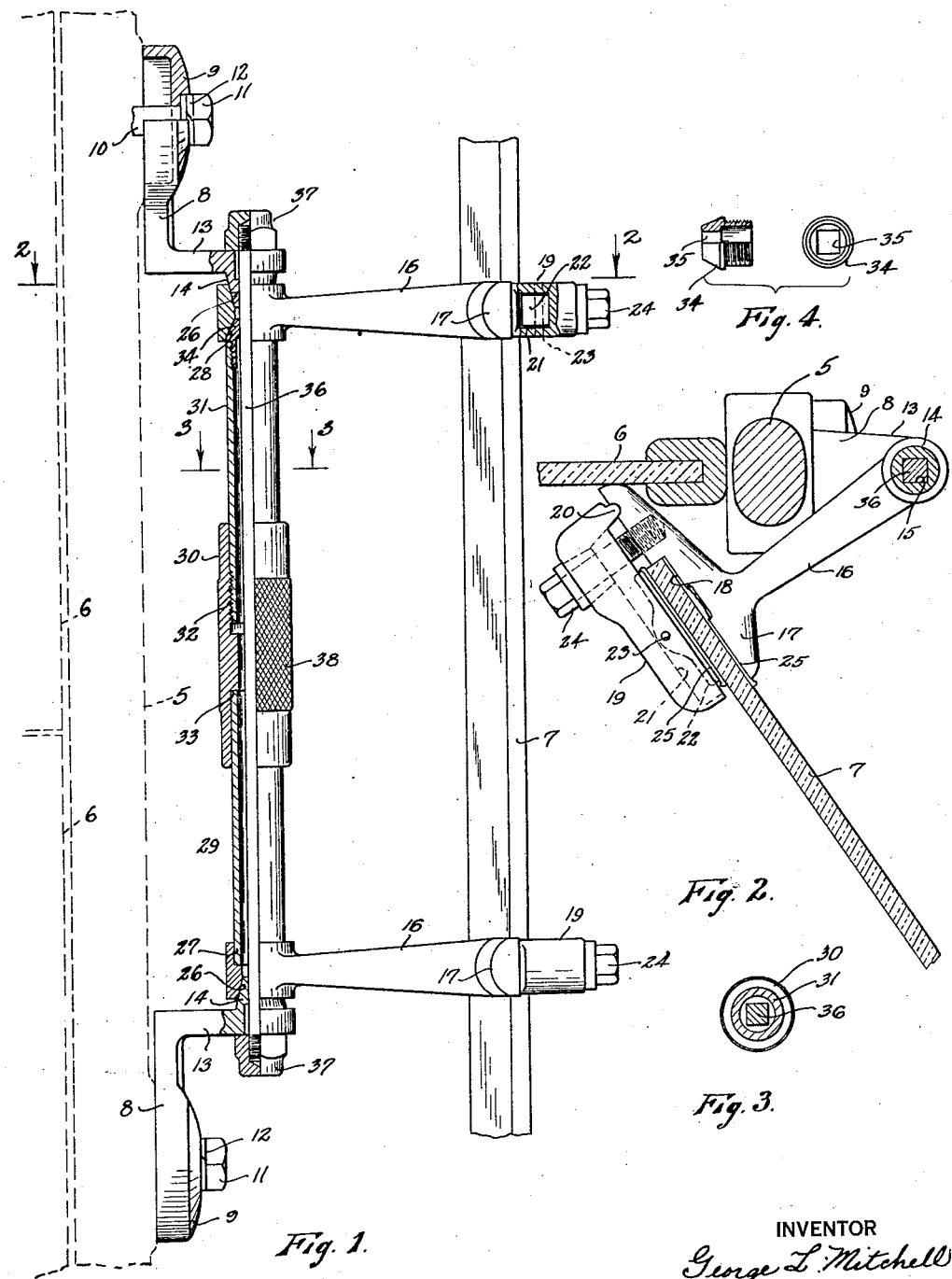

1,531,870

UNITED STATES PATENT OFFICE.

GEORGE L. MITCHELL, OF SANTA MONICA, CALIFORNIA.

WINDSHIELD WING SUPPORT.

Application filed January 29, 1923. Serial No. 615,713.

*To all whom it may concern:*

Be it known that I, GEORGE L. MITCHELL, a citizen of the United States, residing at Santa Monica, county of Los Angeles, State of California, have invented new and useful Windshield Wing Supports, of which the following is a specification.

This invention relates to wing deflectors to be mounted at the side of automobile windshields and particularly to the bracket for supporting this deflector.

It has for an object to provide an improved supporting means for the deflector which will be simple in construction and may be manufactured at low cost, which will securely fasten the deflector in any adjusted position, which may be easily and quickly operated either to release the deflector supporting arms to allow adjustment of the deflector or to secure the same in adjusted position, and which will be neat and attractive in appearance.

With the foregoing and other objects in view I have devised the construction illustrated in the accompanying drawing, in which—

Fig. 1 is an elevation of the deflector and its supporting means showing it mounted at one side of a wind shield, portions thereof being broken away to more clearly show the construction.

Fig. 2 is a transverse section substantially on line 2—2 of Fig. 1, but showing the deflector plate in a different position.

Fig. 3 is a transverse section substantially on line 3—3 of Fig. 1, and

Fig. 4 are detailed side and end views of an end member for the deflector arm securing means.

At 5 I have shown one of the uprights at one end of the windshield in which the sections 6 of the windshield are pivotally mounted in the usual manner, and at 7 is indicated a glass plate constituting the wing deflector. For securing this deflector to the frame 5 I have provided two brackets 8, in the present instance provided with cups 9 adapted to fit over the outer ends of the pivotal connection for the windshield sections 6 and secured thereover by having the pivot bolts 10 extending therethrough, and clamped in position by means of the usual nuts 11 which are kept from accidentally loosening by means of split spring securing washers 12. These brackets have horizontally extending arms 13 which are provided with conical bearings 14 having non circular openings 15 therethrough.

The plate or deflector 7 is clamped in the supporting arms 16. It may be secured to these arms in various ways, but I prefer that substantially as shown in which the arms are provided with a transverse head 17 recessed at 18 to receive one edge of the plate which is clamped therein by the clamp 19. This clamp has a rounded rib 20 fitting in a recess in the head to form a pivotal connection therewith, and is recessed at 21 to receive a clamping shoe 22 which is pivoted in this recess by means of a pin 23. A clamping bolt 24 is threaded in the head and passes through the clamp and by tightening up on this bolt the plate is securely clamped in position. Suitable rubber or fibre pads 25 are placed between the clamping elements and the glass to protect the same from injury by the clamping elements.

The arms 13 are provided with tapered recesses 26 forming tapered bearings adapted to receive the conical bearings 14 of the brackets and on the opposite sides of these arms from the tapered recesses are other recesses 27 and 28 one of which, preferably that in the upper arm, is also tapered, though both may be tapered if desired. Seated at its opposite ends in these recesses is a tubular connecting means preferably comprising a plurality of sections 29, 30 and 31, two of which, 30 and 31, have threaded connection, as shown at 32, while the connection between 29 and 30 is merely a telescopic connection, relative longitudinal movement of these two elements being limited by engagement of one end of the section 29 against the shoulder 33 in the element 30. This connection is to allow relative turning movement between the elements 29 and 30, although if preferred the element 29 may turn in the lower arm 16. The upper end of the section 31 is tapered so as to fit the recess 28 and may be in one piece with the section 31, but I prefer to make it a separate element 34 having threaded engagement with the end of the section 31 and provided with a non-circular opening 35 to engage the non-circular rod 36 so as to prevent turning of the section 31 on the rod. This rod extends through the connecting means comprising the tubular elements 29, 30 and 31, the arms 16 and the openings in the bracket arms 13, and fits the non-circular openings therein so that it will not turn in these arms. I prefer to make this rod substantially square and the openings 15 and 35 to correspond, though other shapes may be employed if desired. The opposite ends of the rods 36 are threaded to receive suitable nuts 37 which clamp against the outer sides of the bracket arms.

In operation after the elements have been suitably assembled as shown, by rotating the element 30 the length of the connecting means between the supporting arms comprising the sections 29, 30 and 31 may be varied by rotating the element 30, because as the section 31 cannot turn, the threaded connection between these two elements will cause relative longitudinal movement. Therefore, by turning this element to lengthen the connection the tapered bearings 26 in the arms may be pressed tightly against the conical bearings 14 carried by the brackets and will securely clamp them in any adjusted position desired. By turning the element 30 in the opposite direction the length of the connecting link may be shortened, releasing the arms and allowing easy adjustment thereof. The tapered bearings provide a very rigid clamping effect with a small relative movement of the elements besides compensating for wear between the same, and also facilitate freeing of the elements to allow the arms to be adjusted when the clamping means is released. The bearings between the ends of the sections 29 and 31 and the supporting arms are such as to allow easy adjustment of these arms. The outer surface of the clamping members 30 may be knurled, as shown at 38, or may be polygonal in cross section to facilitate turning of this element in releasing or clamping the arms.

It will be apparent from the foregoing description that the supporting means for the deflector is very simple in construction and neat in appearance, that it may be easily operated to release the deflector supporting arms for adjustment and will securely hold the same in adjusted positions. Also that any wear of the relatively movable elements will be compensated for so that this wear will not cause them to become loose and rattle. Further that with operation of a single element both arms are securely clamped in position or both may be released at the same time, and that, therefore, the strain of air pressure on the plate is uniformly distributed to both arms and there will be no cramping action on the plate tending to break the glass. It will also be apparent from Fig. 2 that the deflector plate may be adjusted to assume a position with its front edge immediately back of the windshield.

Having thus set forth the nature of my invention, what I claim is:

1. In a wing deflector for automobile wind shields, a pair of spaced carrier brackets provided with opposed conical bearings, a deflector, a pair of supporting arms for said deflector having conical bearings engaging those on the brackets for adjusting the angular position of the deflector, and manually operative means between the arms for causing a binding action between the bearings carried by the brackets and the bearings carried by the arms to secure the arms in adjusted positions.

2. In a wing deflector for automobile wind shields, a pair of spaced carrier brackets provided with opposed conical bearings, a deflector, a pair of supporting arms for said deflector having conical bearings engaging those on the brackets for adjusting the angular position of the deflector, and means between the arms for moving them in opposite directions to cause a clamping action between the respective bearings carried by the brackets and the arms to secure the arms in adjusted positions.

3. In a wing deflector for automobile wind shields, a pair of spaced brackets provided with opposed conical bearings, a deflector, a pair of supporting arms for said deflector provided with conical bearings engaging said first bearings for adjusting the angular position of the deflector, a connection between said arms, and means for varying the length of said connection to move said arms in opposite directions to clamp the bearings carried by the arms and the bearings carried by the brackets together to secure the arms against movement or to release the arms to allow adjustment thereof.

4. In a wing deflector for automobile wind shields, a pair of spaced brackets provided with opposed conical bearings having non-circular openings therethrough, a non-circular rod extending through said openings, nuts threaded on the rod on opposite sides of the brackets, a deflector, supporting arms for said deflector provided with conical bearings adapted to engage the bearings carried by the brackets, said arms being provided with opposed recesses, and a tubular connecting means embracing said rod and seated at its opposite ends in said recesses, said connecting means comprising sections having threaded engagement whereby the length of the connecting means may be varied to clamp the arms against the brackets.

5. In a wing deflector for automobile wind shields, a pair of spaced brackets provided with opposed conical bearings having non-circular openings therethrough, a non-circular rod extending through said openings, nuts threaded on the rod on opposite sides of the brackets, a deflector, supporting arms for said deflector provided with tapered bearings adapted to receive the conical bearings of the brackets, said arms having recesses on the opposite sides thereof from said bearings one of which recesses is tapered, and a tubular connecting means embracing said rod having its opposite ends seated in said recesses one of which ends is tapered and provided with a non-circular opening therethrough for said rod, said connecting means comprising sections having threaded engagement whereby the length of said means may be adjusted to clamp the arms against the brackets.

6. In a wing deflector for automobile wind shields, a pair of spaced brackets provided with opposed conical bearings having openings therethrough, one of said openings being non-circular, a non-circular rod extending through said openings, holding means on the rod on opposite sides of the brackets, one of said means being a nut having threaded engagement with the rod, a deflector, spaced supporting drums for said deflector provided with conical bearings engaging the bearings carried by the brackets for adjusting the angular position of the deflector, and a tubular connecting means embracing said rod and engaging said arms at its opposite ends, said connecting means comprising sections having threaded engagement whereby the length of the connecting means may be varied.

7. In a wing deflector for automobile wind shields, a pair of spaced brackets having non-circular openings therein, a non-circular rod extending through said openings, holding means on the rod on opposite sides of said brackets, one of said means being a nut having threaded engagement with the rod, a deflector, spaced supporting arms for the deflector engaging said brackets and adapted for turning movement relative thereto for adjusting the angular position of the deflector, and a tubular connecting means embracing said rod and engaging said arms at its opposite ends, said connecting means comprising sections having threaded engagement whereby the length of the connecting means may be varied to clamp the arms against the brackets.

8. In a wing deflector for automobile wind shields, a bracket, means for securing the bracket to a main wind shield frame, said bracket being provided with a conical bearing extending therefrom having a non-circular opening therein, a deflector, a supporting arm for the deflector having a conical bearing engaging the bearing on the bracket for adjusting the angular position of the deflector, a non-circular rod extending through said openings and said arm, and means on the rod for drawing the arm and bracket together to secure the arm in adjusted positions.

In testimony whereof I affix my signature.

GEORGE L. MITCHELL.